United States Patent [19]

Moffat

[11] 3,912,411
[45] Oct. 14, 1975

[54] THREAD LATCHING MECHANISM

[76] Inventor: Robert H. Moffat, 8554 Nevada, Canoga Park, Calif. 91304

[22] Filed: Apr. 5, 1974

[21] Appl. No.: 458,212

Related U.S. Application Data

[63] Continuation-in-part of Ser. No. 182,768, Sept. 22, 1971, abandoned.

[52] U.S. Cl. .............. 403/259; 403/316; 403/320; 403/322
[51] Int. Cl.² ........................................... F16D 1/06
[58] Field of Search .......... 403/322, 325, 320, 316, 403/259, 261; 285/391; 151/6, 8; 24/221

[56] References Cited
UNITED STATES PATENTS

| 798,996 | 9/1905 | Dyer | 151/8 |
| 2,066,956 | 1/1937 | Williams | 285/391 |
| 2,369,297 | 2/1945 | Johnson | 151/8 UX |
| 3,514,003 | 5/1970 | Fitzgerald | 215/221 |
| 3,516,563 | 6/1970 | Durso et al. | 215/221 |

Primary Examiner—Andrew V. Kundrat
Attorney, Agent, or Firm—Whann & McManigal

[57] ABSTRACT

A thread latching mechanism comprising rotatably driven first and second cooperating members which are axially movable relative to each other against the urging of a biasing element to a position where a thread segment on one is in alignment with a thread discontinuity on the other so as to form a continuous thread enabling a third threaded member carrying a replaceable element such as a grinding disc to be threadably engaged to the assemblage. When the third member is fully engaged with the assemblage, it is securely locked in place thereon by the thread segment which, due to the urging of the biasing element, automatically returns to its normally misaligned position.

18 Claims, 28 Drawing Figures

THREAD LATCHING MECHANISM

This application is a continuation-in-part of application Ser. No. 182,768, filed Sept. 22, 1971, and now abandoned.

BACKGROUND OF THE INVENTION

1. Field of the Invention

This invention relates generally to coupling devices for coupling replaceable elements to power devices and more particularly to a novel thread latching quick coupling mechanism for coupling various types of elements to a power device and automatically locking them in place thereon.

2. Description of the Prior Art

Abrasive devices such as portable or mounted driving motors adapted to rotatably carry sanding or grinding wheels or discs are in wide use throughout various industries. The abrasive discs and grinding wheels are generally relatively inexpensive and wear out in a short period of time, requiring frequent replacement. It is common practice to have a mounting plate secured to the shaft of the power device and to attach the wheels or discs to the device by securing a nut onto the end of the shaft. This practice is cumbersome, time consuming and often dangerous. To replace the wheel or disc the workman must stop work, locate the proper tools to loosen the nut, replace the disc and re-tighten the nut. Not only is this practice inefficient, but more importantly, continued replacement of the grinding discs and reuse of the fastening elements can cause them to wear and become highly dangerous to use.

There are disclosed in the patented prior art various types of quick attachment devices designed to reduce the time for replacement of the replaceable elements. These devices, however, are often complicated to use, expensive to manufacture and sometimes unreliable.

SUMMARY OF THE INVENTION

It is an object of my invention to provide a thread latching mechanism which can be used for the quick coupling and decoupling of replaceable elements such as grinding wheels and discs with motorized power tools, and one which automatically locks the replaceable element safely and securely in place on the power tool.

It is another object of my invention to provide a mechanism of the type described in the preceding paragraph in which the locking or latching function is accomplished through the use of first and second cooperating members which may be moved axially relative to each other against the urging of a biasing mechanism so as to move the thread segments provided on one member into register with the thread discontinuities provided on the other member to permit a third member, which carries the replaceable element, to be threadably engaged to the assemblage. After full engagement of the third member, the parts are constructed so that the thread segments automatically return to their normally misaligned position blocking the threads on the first member, thereby preventing removal of the third member.

It is a further object of my invention to provide a combination as described in which the biasing mechanism includes a supporting element for supporting both the first member and the replaceable element, and is provided with a central aperture adapted to telescopically receive the second member which, in turn, is interconnected to a hub member. A compression spring interposed between the supporting element and the hub member serves to normally hold the thread segment of the second member out of register with the threads on the first member.

It is another object of my invention to provide a thread latching mechanism of the type referred to in which the third threaded member is adapted to pressurally engage the assemblage of the first and second threaded members in a manner as to urge relative movement between the members against the resistance of the biasing mechanism so as to move the threaded segments into register with the thread discontinuities to permit the third member to fully threadably mate with the assemblage.

It is a further object of my invention to provide a thread latching mechanism of the type described in which the assemblage of the first and second members is adapted to be drivably secured to a rotary driving element of a power tool.

It is still a further object of my invention to provide a combination as referred to in the preceding paragraph in which the assemblage is adapted to receive third members which will carry various types of replaceable elements such as flat and cup-shaped grinding wheels, abrasive coated discs, buffing wheels or the like.

It is another object of my invention to provide a combination of the class previously described in which the biasing mechanism includes a pin member which interconnects the first and second members in a manner such that the threadsegments are in a misaligned orientation relative to the thread discontinuities due to the urging of a compression spring which is interposed between the first and second members.

It is still another object of my invention to provide a mechanism of the class described in which a locking release mechanism is provided for manually moving the thread segments into register with the thread discontinuities when the third member is latched to the assemblage so as to permit the third member to be threadably removed from the first member.

It is another object of my invention to provide a combination of the character referred to in which rotation of the rotary drive element of the power tool will urge the replaceable element carried by the third member into pressural engagement with the supporting element.

It is a further object of my invention to provide a combination as referred to in the preceding paragraph in which, when the rotary drive element is de-energized and stops its rotation, the pressural engagement between the replacement element and the supporting element will be relieved, allowing the third member to be easily threadably removed from the first member when the locking release mechanism is operated.

My invention provides a strong, durable and very safe mechanism for releasably mounting an abrasive wheel, disc or like element to the rotating shaft of a power device. The invention provides a combination which is easy to operate without the necessity for separate tools, and one which permits the replaceable element to be quickly and efficiently coupled to and decoupled from the power device.

BRIEF DESCRIPTION OF THE DRAWINGS

FIG. 15 shows the position of the parts after the third member has been threaded onto the latching assemblage.

DETAILED DESCRIPTION OF THE EMBODIMENTS

Figure 1:
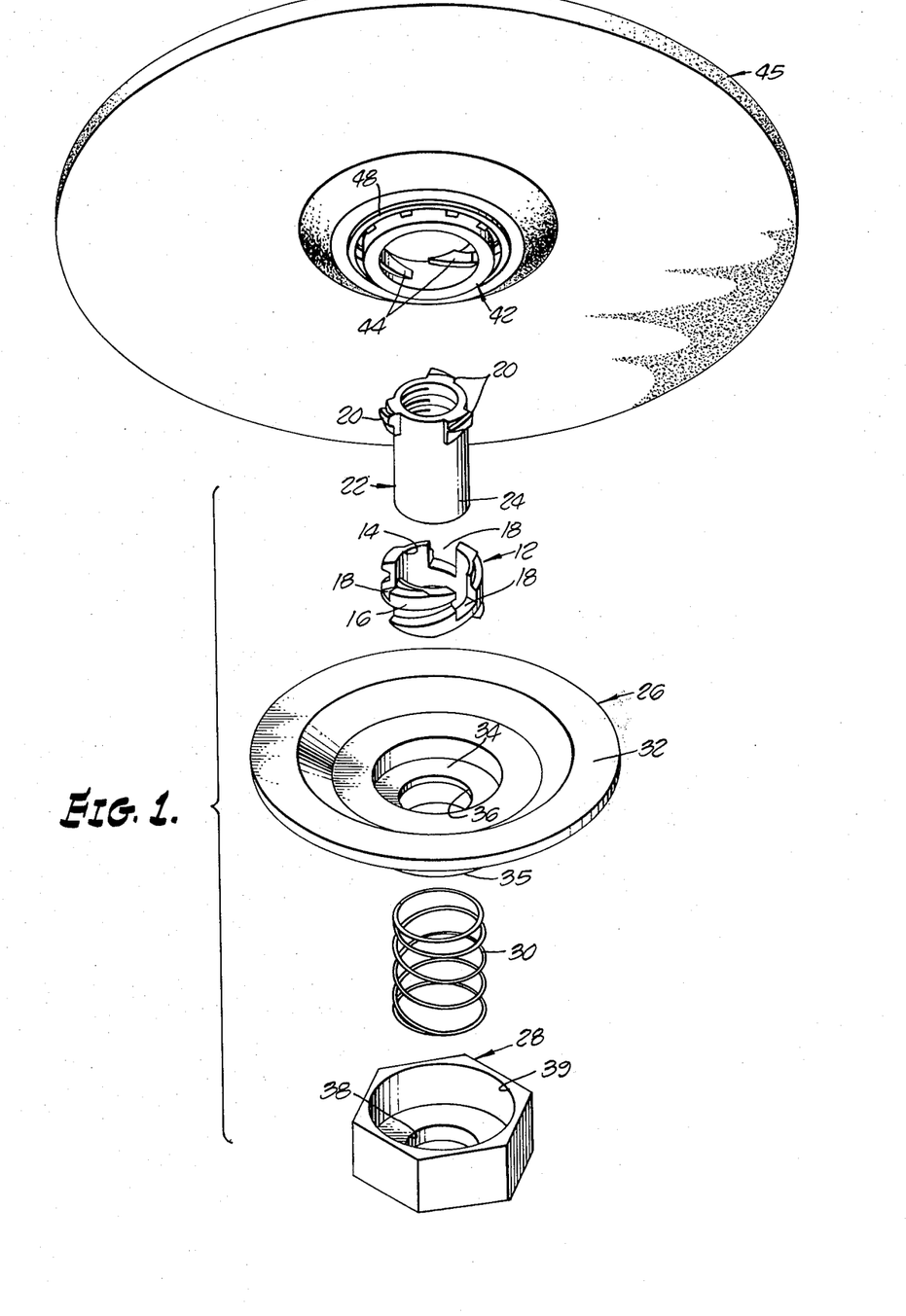
FIG. 1 is an expanded view showing the various elements which comprise one embodiment of my invention.

Referring first to FIGS. 1 through 5, one embodiment of the device of my invention is shown. Referring particularly to FIG. 1, the device can be seen to comprise a first threaded member 12 which is generally cylindrical in shape having a centrally disposed axially extending bore 14 and an external thread 16. Thread 16 is formed with a plurality of thread discontinuities or interruptions 18 which are adapted to mate with thread segments 20 on a second generally cylindrically-shaped member 22 which has a shank portion 24 adapted to be telescopically received in bore 14 of first member 12. Shank portion 24 is internally threaded for attachment to a rotary element of the type typically found on various types of power tools.

First and second member 12 and 22 are axially movable relative to each other in a manner so that thread segments 20 can be aligned with threads 16 so as to form a continuous thread on the first member. A biasing means for normally holding the thread segments in a misaligned position, i.e., out of register or continuity with thread 16, is provided in this embodiment in the form of a supporting means or disc-shaped member 26 for supporting first member 12, a hub member or hub nut 28 and a compression spring 30 adapted to be interposed between members 26 and 28. Disc 26 is generally dish-shaped and has an outer supporting face 32, an inner supporting face 34, which supports first member 12, and a skirt portion 35 which has a counterbore 36 adapted to telescopically receive shank 24 of second member 22.

Figure 2:
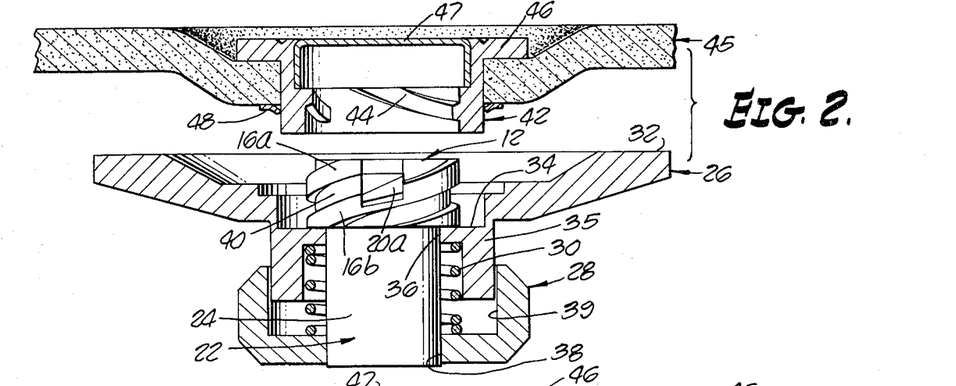
FIG. 2 is a cross-sectional view showing the arrangement of the cooperating first and second members of the latching assemblage ready to receive the replacement element or grinding wheel or disc which is carried by a threaded third member.
Figure 3:
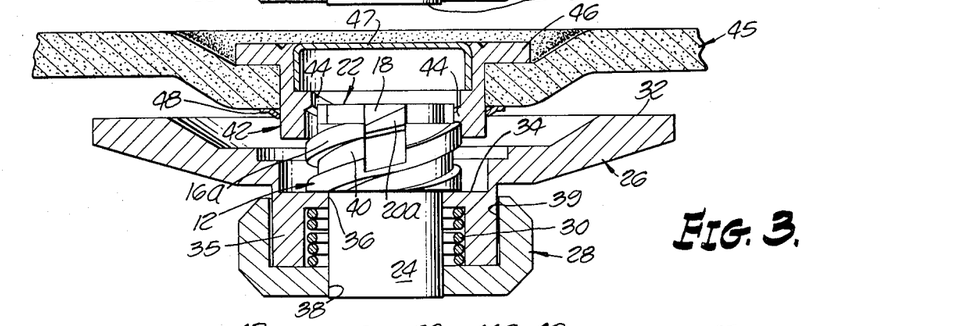
FIG. 3 is a view similar to FIG. 2, but showing the third member in initial pressural engagement with the latching assemblage with the thread segments of the second member moved into register with the threads on the first member.
Figure 4:
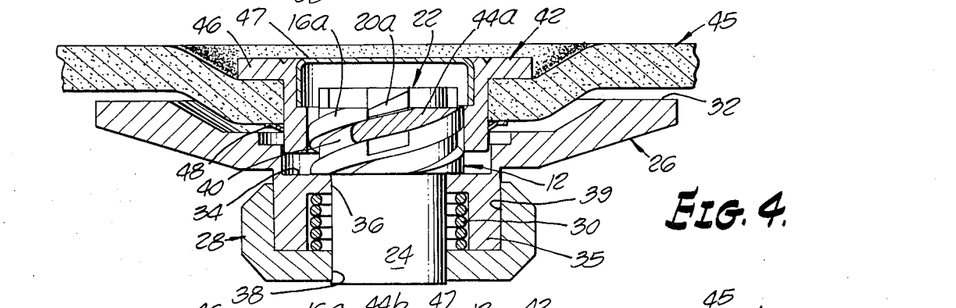
FIG. 4 illustrates the position of the parts after the third member has been partially rotated onto the latching assemblage.

When the parts of the device are assembled together as is shown in the lower portion of FIG. 2, shank 24 of second member 22 extends through bore 14 of first member 12, through bore 36 of disc 26, through spring 30 and is press fit into an axial bore 38 in hub member 28, or is otherwise affixed thereto in any suitable manner. As illustrated in FIG. 2, when the parts are positioned in the manner described, spring 30 is held captive between disc 26 and hub nut 28 in a partially compressed state with skirt 35 of disc 26 extending a short distance into a counterbore 39 in hub member 28. It is to be noted that in this configuration thread segment 20 of second member 22 is partially blocking a groove 40 which is formed between thread portions 16a and 16b of first member 12 so as to prevent passage of a mating thread carried by a mating third member 42. It is also important to note that with the parts in the position shown in FIG. 2, a downward pressure exerted on first member 12 will cause second member 22 to move axially relative to first member 12 against the urging of compression spring 30, permitting thread segment 20a to be oriented as shown in FIG. 3.

Turning again to FIG. 1, third threaded member 42 as shown near the top of the drawing is generally cylindrical in shape having internal threads 44 which are adapted to threadably mate with threads 16 on first member 12. Third member 42 is adapted to carry a replaceable element such as a grinding disc or wheel generally designated by the numeral 45 and, as shown in FIG. 3, is provided with a flange portion 46 which engages the outer face of the wheel or disc. A dust cap 47 is carried within a counterbore in third member 42 to preclude dirt or abrasive particles from entering the latching assemblage. A lock washer or a suitable type of split ring 48 is provided on the underside of the wheel or disc in frictional engagement with third member 42 for the purpose of holding the parts together during shipment of the wheel. Although a grinding wheel or disc is shown by way of illustration, it is to be understood that any type of element which is normally removably interconnected with a rotary drive element of a power device can be used in cooperation with the mechanism of my invention.

OPERATION

With the elements of this embodiment of my invention assembled in the manner shown in the lower part of FIG. 2, and with the latching assemblage thus formed connected to a rotary drive element of a power device by means of the internal threads on shank portion 24 of second member 22, a grinding wheel, disc or other replaceable element carried by third member 42 can be quickly and easily coupled to the power device in the manner described in the following paragraphs.

Referring particularly to FIG. 3, third member 42 is provided with means for pressurally engaging first member 12, shown here as the base portion of thread 44, so that as the upper assemblage, comprising the grinding wheel and the third member, is urged against first member 12 of the latching assemblage with a force sufficient to compress spring 30, second member 22 will move axially relative to first member 12 and thread segment 20a can be moved within thread discontinuity 18 to the position shown in FIG. 3. In this position, thread segment 20a, along with the other thread segments on member 22, is in alignment with the first thread 16a on the second member so as to form a continuous thread. With the parts thusly oriented, third member 42 can be threaded in a clockwise direction onto first member 12 into the position illustrated in FIG. 4. As can clearly be seen in FIG. 4, thread 44a of the third member is now free to move under thread segment 20a within groove 40, thereby permitting the upper and lower assemblages to be moved toward full mating engagement. Continued clockwise rotation of the upper assemblage will move the parts into the position shown in FIG. 5 with replaceable element 45 pressurally contacting face 32 of supporting means 26.

Figure 5:
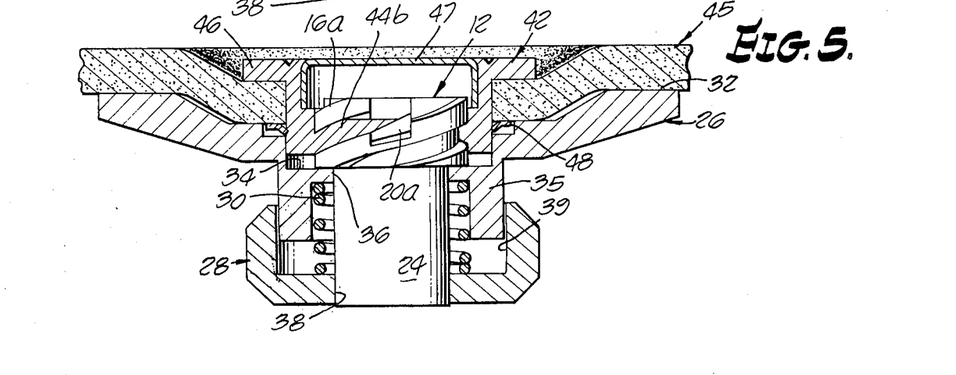
FIG. 5 shows the position of the parts after the third member has been completely threaded onto the latching assemblage and then backed off slightly.

The threads on the cooperating elements of the device of my invention are constructed so that at the point at which the replaceable element moves into pressural contact with the supporting disc, the end of thread 44, designated as 44b in FIG. 5, will move clear of thread discontinuities 18, thereby permitting thread segments 20 pursuant to the urging of spring 30 to return to their normal position, blocking groove 40 and effectively locking the assemblages together. With the parts thus assembled, when the power device is activated so as to cause rotation of the rotary drive element, the replaceable element, due to its inertia, will tend to tighten against the supporting disc in a manner as to firmly support the replaceable element during the grinding operation.

After the upper and lower assemblages are connected, any attempt to rotate the upper assemblage in a counterclockwise direction will cause the threads to move into the position shown in FIG. 5 with the end of thread 44, designated in FIG. 5 as 44b, moving into a camming relationship with thread segments 20. Since in this position thread segments 20 are bottomed out in thread discontinuities 18, further counterclockwise rotation of third member 42 is precluded and the assemblages will remain locked together.

To disassemble third member 42 and the replaceable element which it carries from the lower assemblage, the assemblages must be rotated slightly relative to each other from the position shown in FIG. 5 so as to move thread end 44b clear of the thread discontinuities. Subsequent exertion of a pressural force on third member 42 sufficient to compress spring 30 will then cause flange 35 of the supporting disc to move into counterbore 39 of the hub member and, since the thread segments are no longer blocked by thread 44, second member 22 will be permitted to move axially relative to first member 12. Continued pressure will permit the thread segments to once again be moved to the position illustrated in FIG. 3, thereby forming a continuous thread 16 on first member 12. With the parts held in this position, third member 42 can be rotated in a counterclockwise direction and easily threadably disassembled from first member 12, permitting a replaceable element to then be coupled to the device in the manner previously described.

Figure 6:
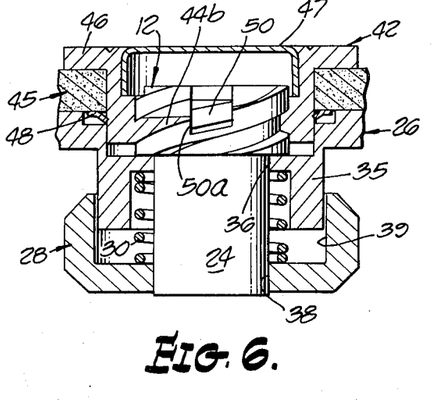
FIG. 6 is a view similar to FIG. 5, but illustrating a different form of thread segment.

In FIG. 6 there is shown another embodiment of my invention in which like numerals have been used to identify like parts as previously described. FIG. 6 is a view of the device similar to that shown in FIG. 5 with the upper and lower assemblages operatively coupled together. In this embodiment of my invention, however, the thread segments identified by the numeral 50 are of a slightly different design and, rather than being tapered so as to form a camming action with thread end 44b upon counterclockwise rotation of the upper assemblage, present an axially disposed face 50a which, as illustrated in FIG. 6, blocks passage of the thread. With this construction, the upper and lower assemblies need not be counter-rotated prior to compressing spring 30 so as to axially move the first and second members relative to each other and to position the thread segments 50 in register with the thread 40 on the first member to permit disassembly of the third member from the lower assemblage.

Figure 7:
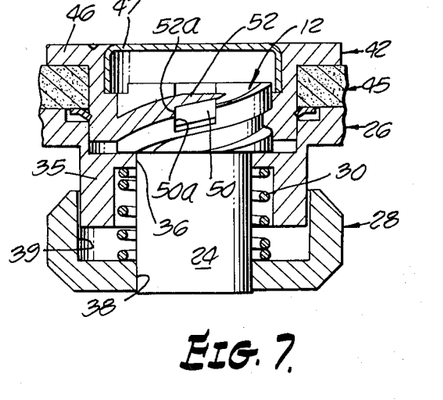
FIG. 7 is also a view similar to FIG. 5, but showing still a different form of thread segment and also a different form of thread on the third member.

FIG. 7 illustrates another embodiment of my invention with like numerals being used to identify like parts described previously. FIG. 7 is a view similar to FIG. 6 showing the upper and lower assemblages operatively coupled together, but illustrating a different type of thread design. In this construction, thread segments 50, similar to those shown in FIG. 6, are used but a stepped thread end designated by the numeral 52 is provided to cooperate with thread segments 50 to block disassembly of the third member from the lower assemblage. As shown in FIG. 7, when the upper assemblage is rotated in a counterclockwise direction, step 52a on thread 52 is adapted to engage thread segment face 50a, thereby preventing further counterclockwise rotation of the upper assemblage. With the construction of the parts of this embodimment, as is the case with the embodiment shown in FIGS. 1–5, the upper and lower assemblages must be slightly rotated relative to each other prior to compressing spring 30 to align the thread segments of the second member with the threads on the first member to permit disassembly of the parts in the manner previously described.

Figures 8, 9:
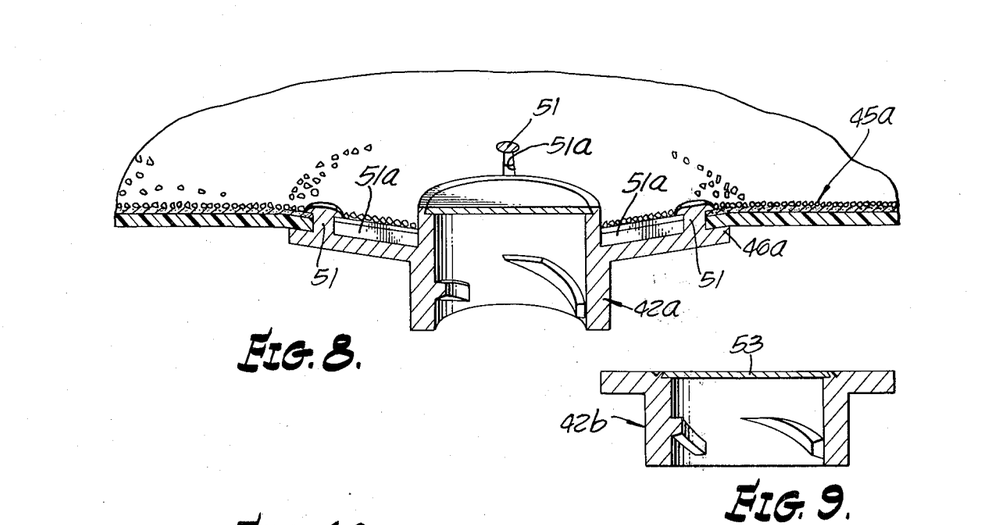
FIG. 8 is a fragmentary perspective view partly in section showing another form of third member adapted to carry a felt-backed flexible abrasive disc.
FIG. 9 is a cross-section view showing still another form of third member presenting a flush upper surface.

In FIG. 8 there is shown another form of a third member and a cooperating detachable element which may be used with the latching mechanism of the embodiments of my invention as previously described. As shown in FIG. 8, internally threaded third member 42a is provided with an integral, radially extending supporting flange 46a which has a plurality of locking elements 51 protruding from its upper surface. These locking elements are adapted to be received in mating apertures formed in a felt-backed coated abrasive disc designated by the numeral 45a. Abrasive disc 45a can be easily attached to and removed from third member 42a by positioning the locking pins in slots 51a provided in the disc, and then forming the disc to the contour of the supporting flange, thereby causing the pins to lock into the mating apertures provided therein. The assemblage can then be coupled with the thread latching means in the manner previously described.

In FIG. 9 there is shown another form of third member 42b which may be used with the embodiments of my invention as previously described. This form of third member is provided with a flush cover element 53 which can be staked into position as illustrated in the drawing, and is useful when it is desired to present a flush outer surface for certain types of grinding and sanding operations.

Figure 10:
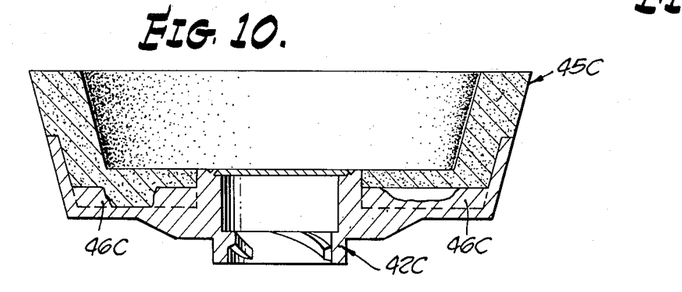
FIG. 10 is a cross-sectional view showing another form of third member adapted to carry a generally cup-shaped grinding element.

In FIG. 10 there is shown still another form of third member designated as 42c. Third member 42c is provided with a plurality of radially extending reinforcing ribs 46c which are adapted to support a cup-shaped replaceable element 45c. This assemblage may be used with the embodiments of my invention as previously described, and when so used is provided with a flush cover 53 of the type illustrated in FIG. 9. This form of third member may also be used with the form of my invention which will be described in the paragraphs which follow, and when so used, the cover portion 53 is removed.

Figures 11, 12:
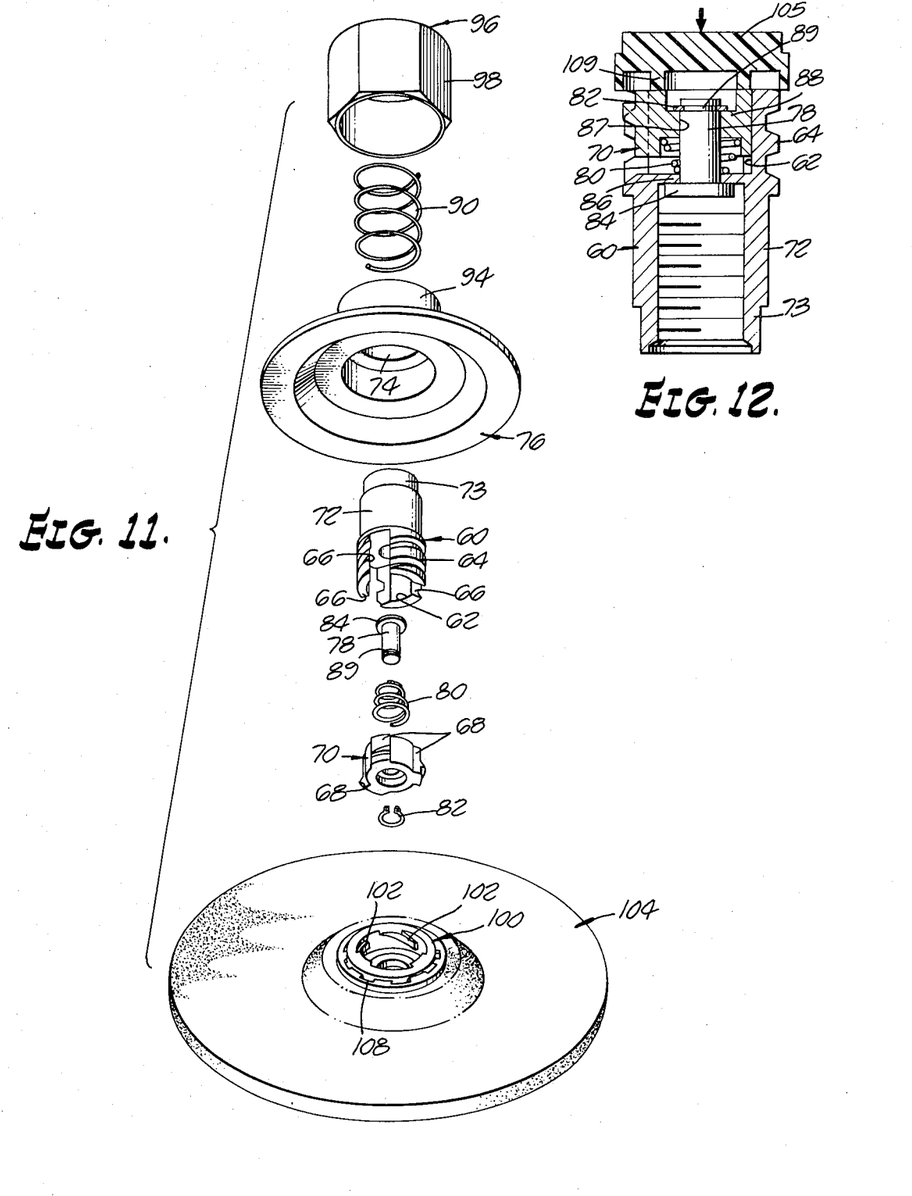
FIG. 11 is an expanded view showing the various elements which comprise another embodiment of my invention.
FIG. 12 is a cross-sectional view showing the arrangement of the cooperating elements of the latching assembly of this form of my invention.

In FIGS. 11–16 there is shown still another embodiment of the mechanism of my invention. Referring particularly to FIG. 11, this embodiment can be seen to comprise a first threaded member 60 which is generally cylindrical in shape having a centrally disposed axially extending bore 62 and an external thread 64. Thread 64 is formed with a plurality of thread discontinuities or interruptions 66 which are adapted to mate with thread segments 68 on a second generally cylindrically shaped member 70. First member 60 has a shank portion 72 adapted to be telescopically received in bore 74 of a support means provided in the form of a support disc 76 for supporting a replaceable element in a manner which will be described hereinafter.

Shank portion 72 is internally threaded for attachment to a rotary element of the type typically formed on various types of power tools. First and second members 60 and 70 are axially movable relative to each other in a manner so that thread segments 68 can be positioned in alignment with threads 64 so as to form a continuous thread on the first member. A biasing means for normally holding the thread segment in a misaligned position, i.e., out of register continuity with thread 64, is provided in this embodiment in the form of a connecting pin 78, a compression spring 80 and a split locking ring 82.

Figure 13:
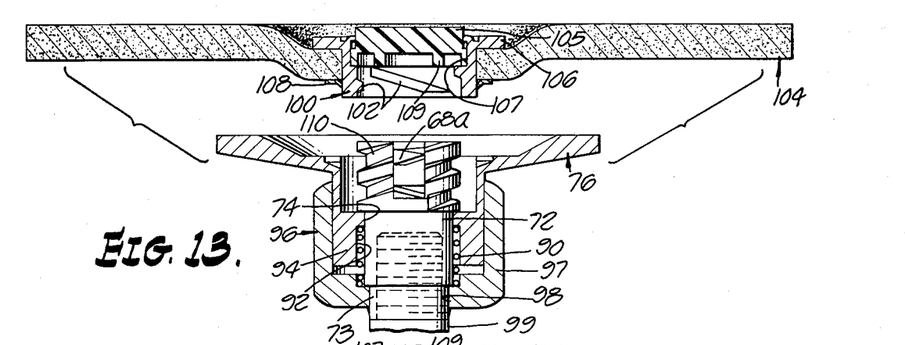
FIG. 13 is a cross-sectional view similar to FIG. 2 showing the arrangement of the cooperating elements of the latching assemblage ready to receive the replacement disc which is carried by a threaded third member.

Referring to FIG. 12, connecting pin 78 can be seen to have a head portion 84 adapted to seat against an internal shoulder 86 provided within bore 62 of first member 60. The shank portion of pin 78 is of a diameter so that it can be telescopically received in a bore 87 formed in an internal wall 88 provided within second member 70 and has, near its extremity, a groove 89 adapted to accommodate a split ring 82. First and second members 60 and 70 are operatively coupled together, as shown in FIG. 12, by inserting pin 78 through a bore formed in internal shoulder 86, through spring 80 and through bore 87 in internal wall 80. Split ring 82 is then secured within groove 89 of the connecting pin so as to hold the parts together in the manner illustrated. In this orientation compression spring 80 is urging against axial movement of second member 70 relative to first member 60 and, as best shown in FIG. 13, thread segments 68 are out of alignment or register with thread 64 on first member 60.

Referring to FIG. 11 and to the lower portion of FIG. 13, the assemblage as illustrated in FIG. 12 is coupled to a power device in the following manner. Shank portion 72 of first member 60, which also has a smaller diameter portion 73, is passed through bore 74 of supporting disc 76, through a second compression spring 90, which is carried within a counterbore 92 provided in skirt portion 94 of disc 76, and is then connected to a hub nut 96 by press fitting shank portion 73 into a bore 98 formed in the end wall of the hub nut. The assemblage thus formed can then be connected to a power device by threading first member 60 onto the rotatable shaft 99 of the power device. A skirt portion 97 of hub nut 96 is slidably receivable over the skirt portion 94 of the supporting disc so that during the coupling of the replaceable element with the device, the hub nut will move axially relative to the disc against the urging of the spring.

Turning again to FIG. 11, near the lower portion of the drawing there is shown a third generally cylindrical threaded member 100 having internal threads 102 which are adapted to mate with threads 64 of first member 60. Carried by third member 100 is a grinding wheel or disc 104 which, as can be seen in FIG. 13, is disposed between a flange 106 on the third member and a lock washer or other suitable locking member 108 which is in frictional engagement with the third member. Locking washer 108 is provided to hold the parts together during shipment and serves to hold the replaceable element against the third member during coupling of the assemblage with a power device.

OPERATION

Figure 14:
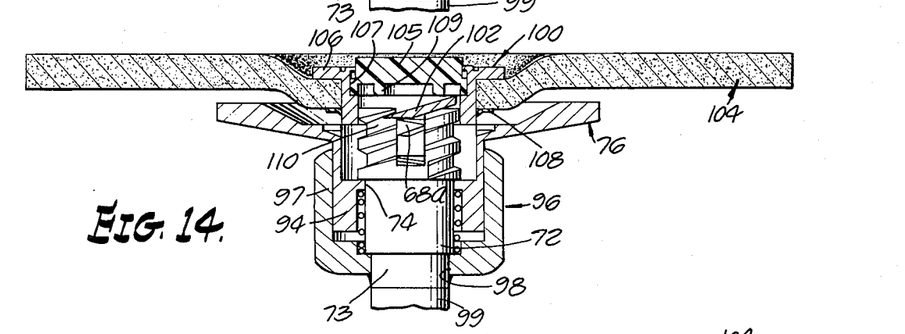
FIG. 14 is a view showing the third member in initial engagement with the latching assemblage with the thread segment being urged into register by the thread on the third member.
Figure 15:
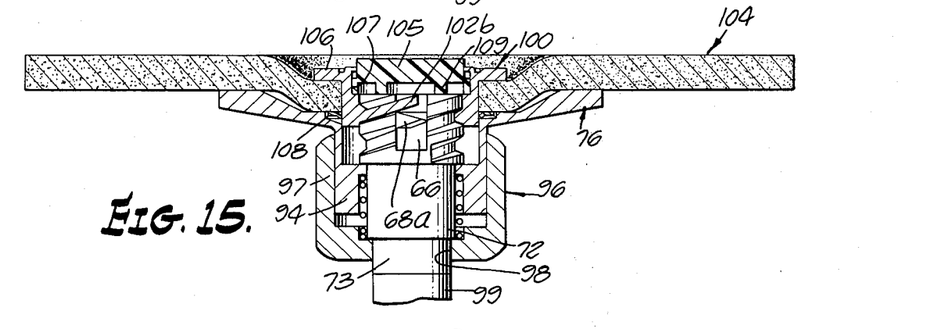
FIG. 15 shows the position of the parts after the third member has been further threaded onto the latching assemblage.
Figure 16:
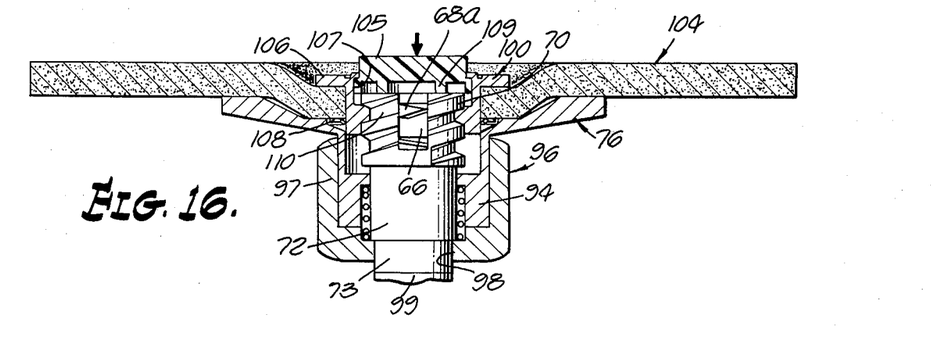

With the elements of this embodiment of my invention assembled together as shown in FIG. 13, the upper assemblage, comprising third member 100 and replaceable element 104, is moved into engagement with the lower assemblage in the manner illustrated in FIG. 14. It is important to note that the thread segment designated 68a in FIGS. 13 and 14, which is normally held in a misaligned orientation relative to groove 110 of first member 60 by the urging of first spring 80, tends to block passage of thread 102 as the upper assemblage is rotated in a clockwise direction. Because of the tapered mating surfaces provided on the thread end and the thread segment, however, continued rotation of the upper assemblage will cause the thread segments of second member 70 to move axially within the thread discontinuities of first member 60 to the position shown in FIG. 14, and finally to the position shown in FIG. 15, thereby allowing threadable mating of the upper and lower assemblages. Upon continued relative rotation of the assemblages, when the point is reached at which the replaceable element contacts the support means 76, the thread end identified by the numeral 102b in FIG. 15, will clear the thread discontinuities 66, thereby permitting the thread segments, due to the urging of spring 80, to return to their normal position as illustrated in FIG. 16. In this position any attempt to threadably remove the upper assemblage will be effectively precluded by the thread segments 68 blocking passage of thread 102.

Referring to FIGS. 12 and 16, there is shown means for moving the thread segment of the second member into register with the thread discontinuity of the first member in the form of a generally cylindrically shaped push button element 105 which is axially movable within a counterbore 107 provided in third member 100. With the parts of the device oriented as shown in FIG. 16, the lower face of a depending flange 109 on push button element 105 is in engagement with second member 70. When it is desired to decouple third member 100 and the replaceable element which it carries from the lower assemblage, the exertion of a pressure on push button 105 in the direction of the arrows sufficient to overcome the resistance of spring 80 will cause the thread segments to move into alignment with the threads on the first member as illustrated in FIG. 15, forming a continuous thread and permitting the third member 100 to be rotated counterclockwise and threadably removed from the first member 60.

It is important to observe that due to the unique thread design of the cooperating parts of the mechanism, when the power device is operating the inertia of the replaceable element will cause it to tighten against the supporting means so that in the event that the push button is accidentally depressed, the replaceable element cannot separate from the thread locking mechanism when the power device is running.

Figure 17:
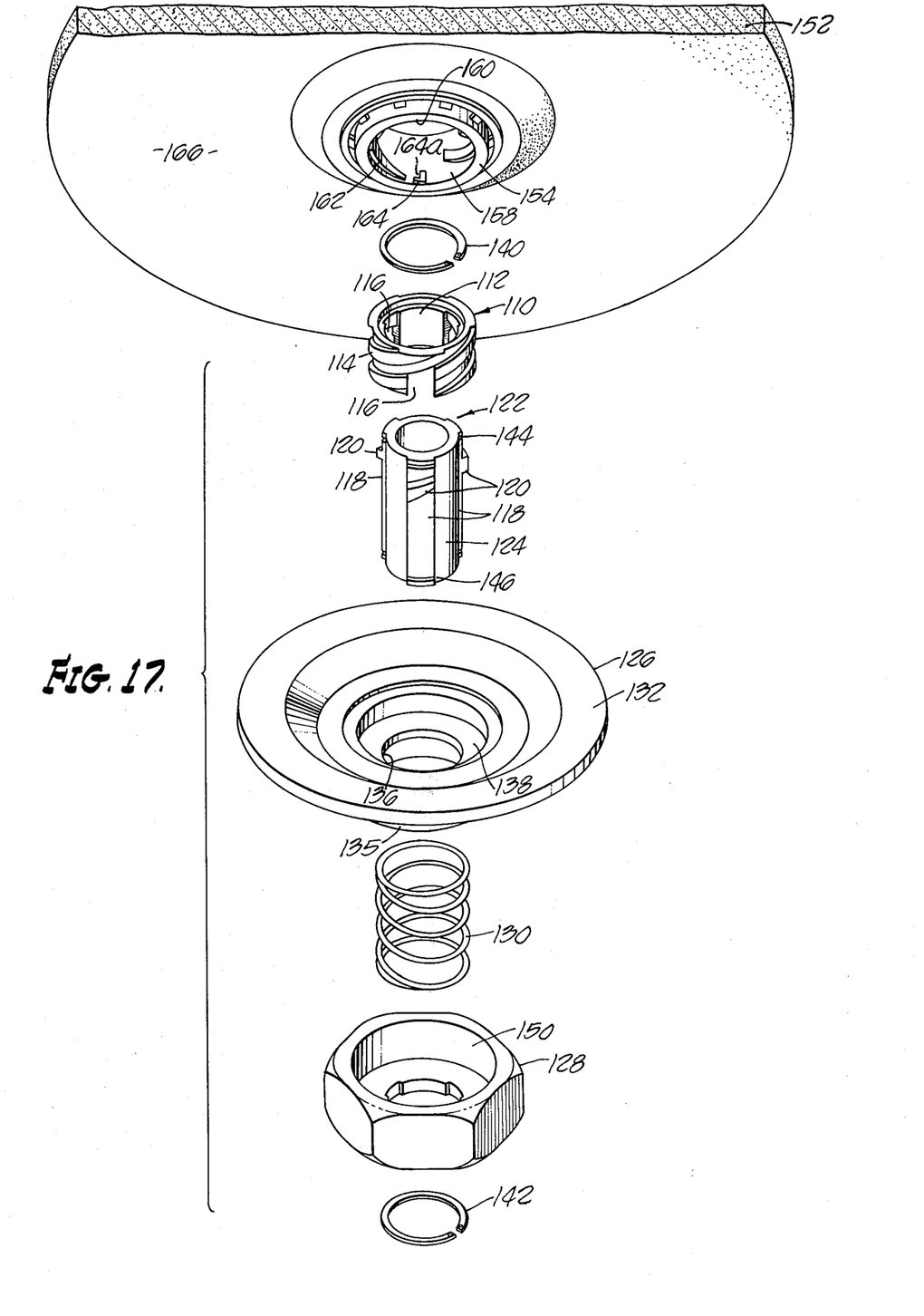
FIG. 17 is an exploded view showing the various elements which comprise a further embodiment of my invention.

Referring now to FIGS. 17–22, another basic embodiment of the device of my invention is illustrated. This form of the invention is similar to that shown in FIGS. 1–5, but as will become apparent from the description which follows, the embodiment provides several important advantages over the embodiment there illustrated. Referring particularly to FIG. 17, the device comprises a driven or first threaded member 110 which is generally cylindrical, has a centrally disposed axially extending bore 112 and an external thread 114. Thread 114 is formed with the plurality of thread discontinuities or interruptions 116 which are adapted to mate with a plurality of driving splines 118 including thread segments 120 which are provided on a second or driving member 122. Driving member 122 is generally cylindrically shaped, has a shank portion 124 and is adapted to be telescopically received within bore 112 of driven member 110. Shank portion 124 is internally threaded for attachment to a rotary drive element of the type typically found on various types of power tools such as sanders, grinders, rotary saws, and the like.

Members 110 and 122 are axially movable relative to one another in a manner so that thread segments 120 can be moved into alignment with interrupted threads 114 to form a continuous thread. A biasing means for normally holding the thread segments in a misaligned position, i.e., out of register or continuity with thread 114, is provided in this embodiment in the form of a supporting means or disc-shaped member 126, a hub member or hub nut 128, and a compression spring 130 which is adapted to be interposed between members 126 and 128. Disc 126 is generally dish-shaped and has an outer supporting face 132 for supporting a replacement element in a manner presently to be described. Disc 126 also has a skirt portion 135 (FIG. 18) which has an axial opening 136 adapted to telescopically receive shank 124 of driving member 122. An inner supporting face 138 is provided to support driven member 110 when the parts are at rest as illustrated in FIG. 18.

Figure 18:
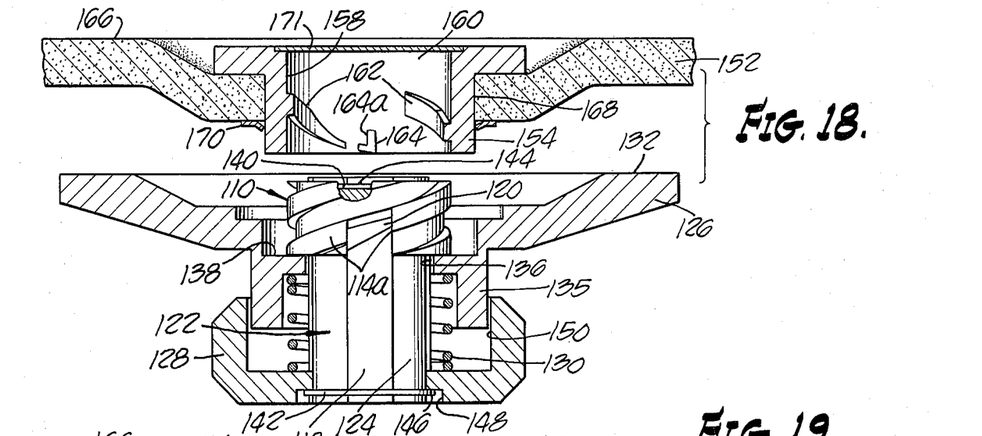
FIG. 18 is a cross-sectional view similar to FIGS. 2 and 13 showing the arrangement of the cooperating elements of the device ready to receive the replacement element, including a threaded adapter and a working member.

As best seen in the lower portion of FIG. 18, shank 124 of driving member 122 extends through bore 112 of driven member 110, through opening 136 of disc 126 and through the axially extending opening defined by spring 130. The assemblage thus described is held together by upper and lower split rings 140 and 142. As best seen by referring simultaneously to FIGS. 17 and 18, ring 140 is removably located in an upper groove 144 provided proximate the upper extremity of member 122 and is of a slightly larger diameter than the diameter of bore 112 formed in member 110. Lower ring 142 seats on radially extending shoulders 146 provided proximate the lower extremity of member 122. When the parts are assembled in the manner illustrated in FIG. 18, spring 130 is held captive between disc 126 and hub nut 128 in a partially compressed state with upper split ring 140 resting on member 110 and lower split ring 142 disposed within a counterbore 148 (FIG. 18) formed in hub member 128. In this configuration, skirt portion 135 of disc 126 is free to move a limited distance within a cylindrically shaped axially aligned opening 150 formed in hub nut 128. It is to be noted that with the assembly at rest as illustrated in FIG. 18, thread segments 120 of driving member 122 are partially blocking the thread portion of driven member 110 designated as 114a in FIG. 18.

It is important to note that with the parts oriented as shown in FIG. 18, a replacement element generally designated in the drawing by the numeral 152 can be threadably connected to member 110 without the necessity of exerting a downward pressure as is necessary during the connection of the replacement element to the threaded assemblage of the embodiment of the invention shown in FIGS. 1–5. Rather, as will be described in greater detail hereinafter, continued threading of the replacement element onto the assemblage illustrated in the lower part of FIG. 18 will automatically result in the temporary alignment of the thread segment 120 with respect to the threaded portion 114a thereby allowing the replacement element to be freely rotatably connected to the assemblage.

Turning once more to FIG. 17, as is shown near the top of the drawing, replacement element or third member 152 includes an adapter 154 having a generally cylindrical wall 158 forming a generally cylindrically shaped opening 160 and a plurality of generally helical shaped circumferentially spaced apart thread segments 162 projecting radially inwardly from the cylindrical wall and adapted to threadably mate with threads 114 on driven member 110. Adapter 154 is also provided with a plurality of first locking shoulders 164 disposed proximate one extremity of each of the thread segments 162. Locking shoulders 164 project radially inwardly from cylindrical wall 158 and have a generally axially extending face 164a. Replacement element or third member 152 also comprises a working element 166 such as a grinding disc, radial saw, sanding member, or the like. The working element is provided with an axial opening 168 adapted to receive adapter 154. The adapter and the working element may be interconnected by means of a lock washer or split ring 170, as shown in FIG. 18, or they may be bonded or otherwise suitably held together. A dust cap 171 is provided to seal the opening 160 in adapter 154 to prevent foreign materials from entering the assemblage.

OPERATION

With the component parts of this embodiment of my invention assembled in the manner shown in the lower part of FIG. 18, and with the latching assemblage thus formed connected to a rotary drive element of a power device by means of the internal threads on shank portion 124 of driving member 122, a third member or replacement element comprising a grinding wheel, sanding disc, saw blade or other working element can be quickly and easily coupled to the power device in the manner now to be described.

Figure 19:
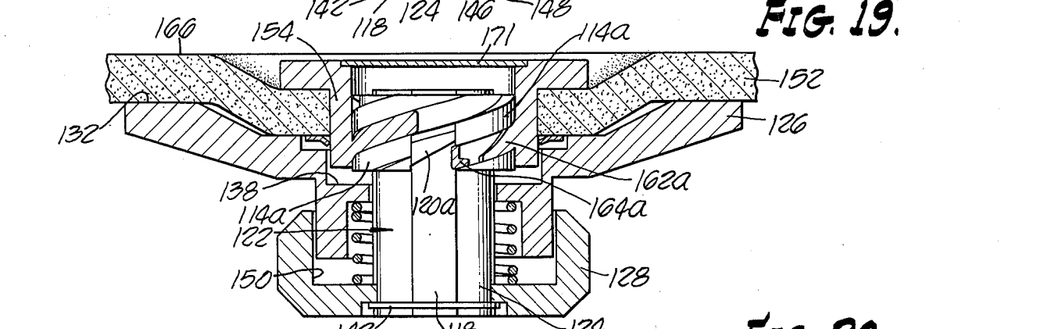
FIG. 19 is a view showing the replacement element in initial engagement with the latching assemblage.
Figure 20:
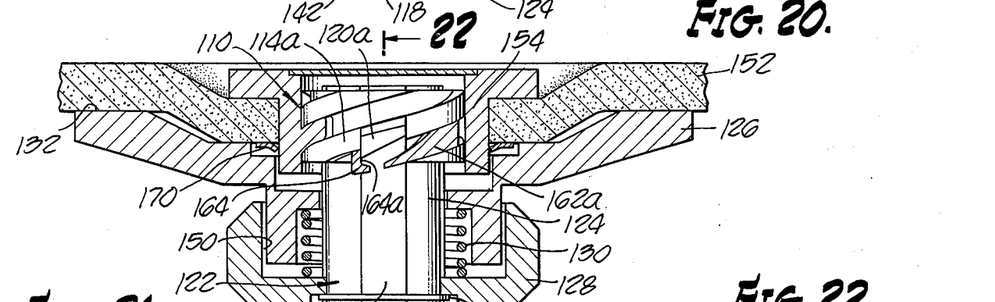
FIG. 20 illustrates the position of the component parts after the replacement element has been further threaded onto the latching assemblage with the replacement element being held in locking engagement with the latching assemblage.

With the component parts of the device oriented as shown in FIG. 18, adapter 154 of third member 152 can be freely threaded in a clockwise direction onto first member 110 into the position illustrated in FIG. 19. As can clearly be seen in FIG. 19, with the upper and lower assemblages in this position, thread 162a and shoulder 164a of adapter 154 are free to move under the lower tapered face thread segment 120a of driving member 140. Engagement of the tapered thread segment by the locking shoulder will cause member 110 to move axially downward relative to member 122 against the urging of spring 130. Continued clockwise rotation of the upper assemblage will move the parts to the position shown in FIG. 21 where the thread segment 120a will align or register with thread 114a. Further rotation will move the parts into the locking position shown in FIG. 20.

The relative movement of the various component parts of the device during the coupling of the replacement element with the driving subassembly can perhaps best be understood by observing the change in position of the driven member 110, the supporting member 126 and the spring 130 during the various stages of the assembly operation as illustrated in FIGS. 18–21. For example, in FIG. 18 wherein the parts are shown at rest with the lower assemblage in condition to receive the upper assemblage or replacement element, members 126 and 110 are urged upwardly by spring 130 and held in position by split ring 140. In FIG. 19, the adapter 154 of the replacement element is shown in partial threaded engagement with the part 110 of the lower assemblage. Note that with the upper and lower assemblages in this position, the working element 166 has moved into engagement with supporting member 126 and locking shoulder 164a is about to engage the out-of-register thread segment 120a of driving member 122. Further rotation of the replacement element will cause the parts to move to the position shown in FIG. 21 wherein it can be seen that members 110 and 126 have moved downwardly relative to both the driving member 122 and the hub nut 128 against the urging of the now significantly compressed spring 130. A slightly further rotation of the replacement element to the point at which shoulder 164 clears thread segment 120 will cause the parts to automatically move into the locking position shown in FIG. 20 wherein it can be seen that spring 130 has urged members 110 and 126 upwardly relative to member 122 causing the thread segment to once more become misaligned with the threads 114a. In this configuration, as is clearly shown in FIG. 22 as well as in FIG. 20, the faces 164a of the locking shoulders engage the thread segments 120 and prevent counterclockwise rotation of the replacement element thereby blocking disassembly of the upper and lower assemblages.

Figure 21:
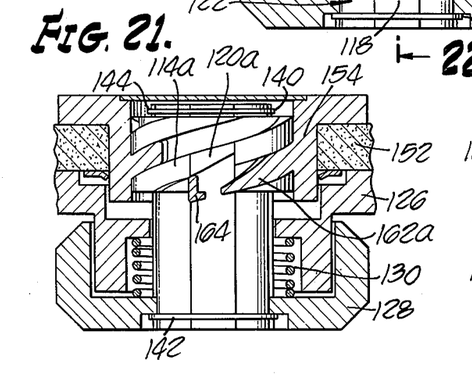
FIG. 21 shows the position of the parts when a downward pressure has been exerted on the replacement element so as to compress the biasing spring and move the thread segment of the second member into alignment with the thread discontinuity of the first member so as to permit removal of the replacement element.
Figure 22:
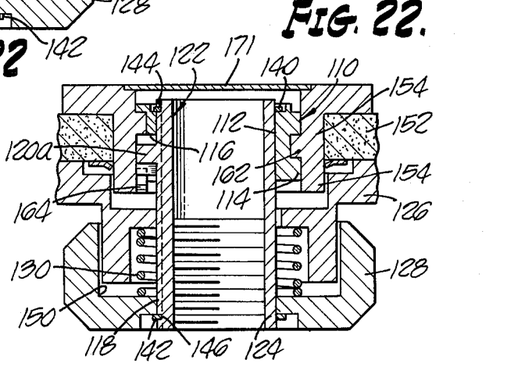
FIG. 22 is a cross-sectional view taken along lines 22—22 of FIG. 20.

In order to remove the replacement element or upper assemblage, downward pressure against the urging of spring 130 must be exerted on the replacement element to compress the spring and move the parts into the orientation shown in FIG. 21. In this configuration, the thread segment is in register with threads 114 forming a continuous thread permitting passage of the locking shoulders and the expeditious decoupling of the replacement element from the driving assemblage.

As is the case with the earlier described embodiments of the invention, due to the unique thread design of the cooperating parts of the device, during operation of the power tool to which the driving member is threadably connected, inertia will cause the replacement element to tighten against the supporting means further precluding separation of the replacement element from the latching mechanism during operation of the tool.

In FIGS. 23–28, there is shown yet another form of the invention. This embodiment is very similar to that shown in FIGS. 18–22 and like numerals have been used to identify like parts. This embodiment also has the advantage that the upper assemblage may be freely threaded onto the lower assemblage without the exertion of an initial downward pressure as required in assembling the earlier-described embodiments. Additionally, this latter embodiment is provided with a unique double locking safety system designed to absolutely preclude accidental disassembly of the replacement element from the driving assemblage.

Figure 23:
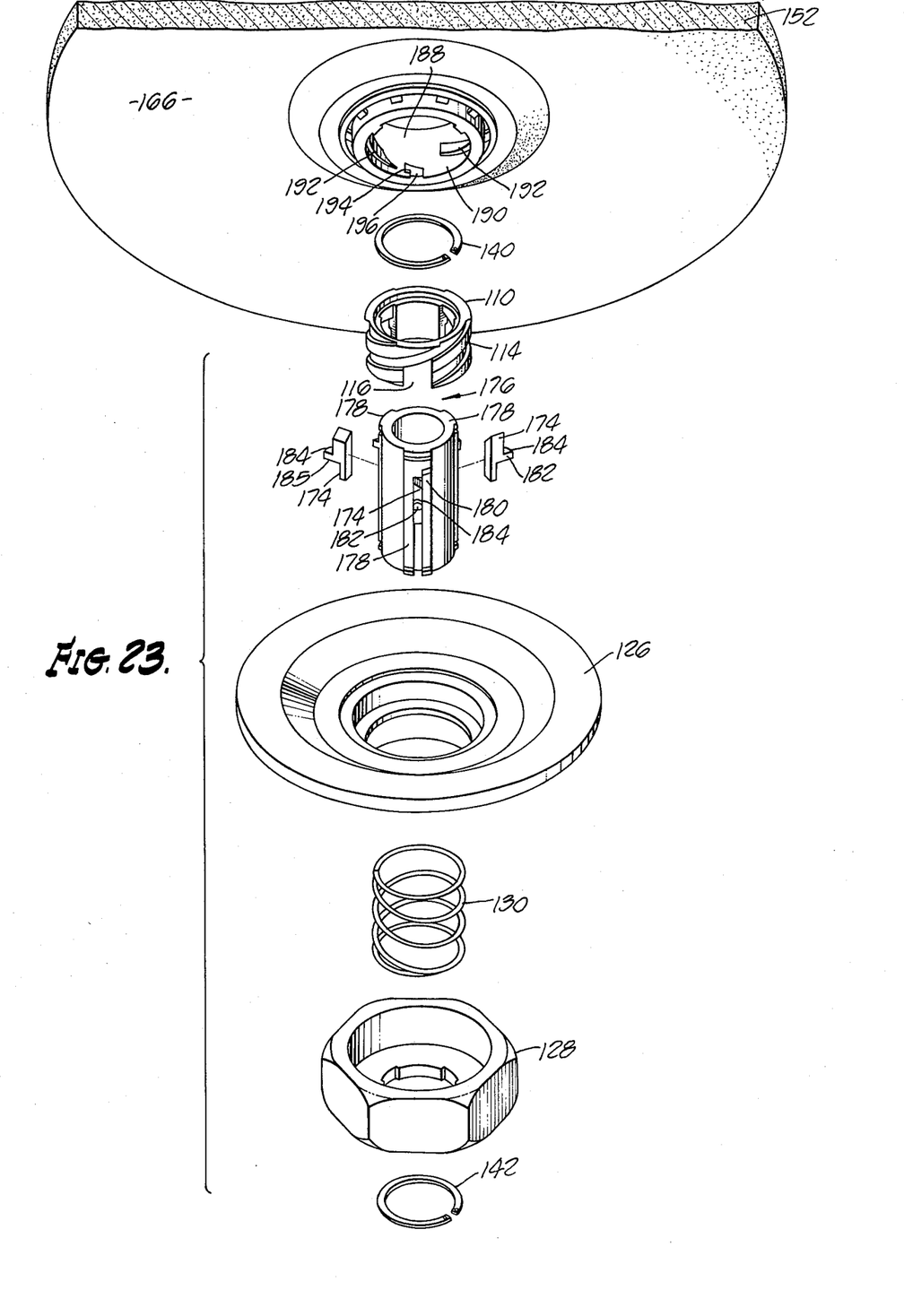
FIG. 23 is an exploded view showing the component parts which comprise still another form of my invention having a back-up safety locking mechanism.

Referring particularly to FIG. 23, it can be seen that the various components of the device of this form of the invention are similarly configured to those shown in FIGS. 18–23 with the exception that two locking shoulders are provided on the adapter of the replacement element 152 and a back-up safety locking means is provided in the form of a plurality of safety locking members 174, carried by a slightly differently configured driving member 176.

Figure 24:
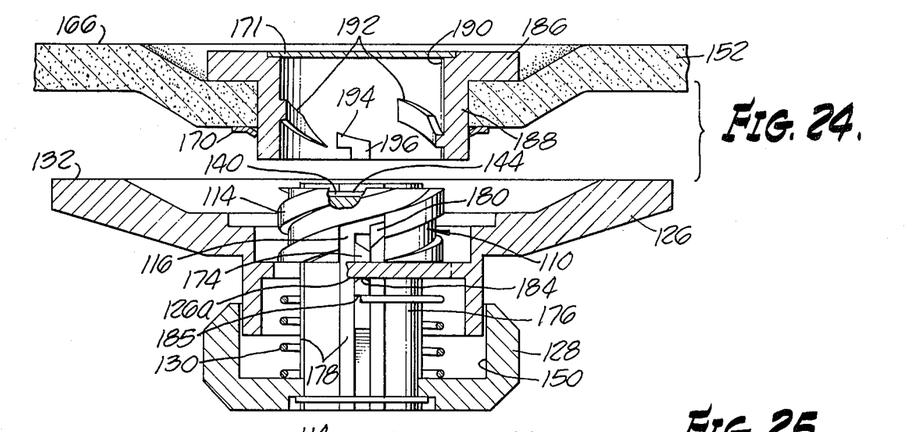
FIG. 24 is a cross-sectional view showing the arrangement of the cooperating elements of the latching assemblage ready to receive a replacement element.
Figure 28:
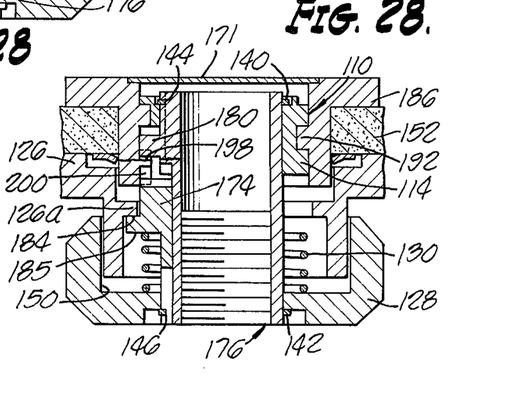
FIG. 28 is a cross-sectional view taken along lines 28—28 of FIG. 27.

As can best be seen by referring simultaneously to FIGS. 23 and 24, driving member 176 has three equally spaced apart driving splines 178, each including a thread segment 180. Disposed proximate thread segments 180 and axially slidably movable relative thereto within grooves formed in driving member 176 are the previously mentioned safety locking members 174. Referring particularly to FIGS. 24 and 28, each locking member 174 is provided with a radially outward extending arm or protrusion 182 defining an upper face 184 adapted to operatively engage flange 126a (FIG. 24) of supporting member 126 and a lower face 185 adapted to operatively engage spring 130.

Figure 25:
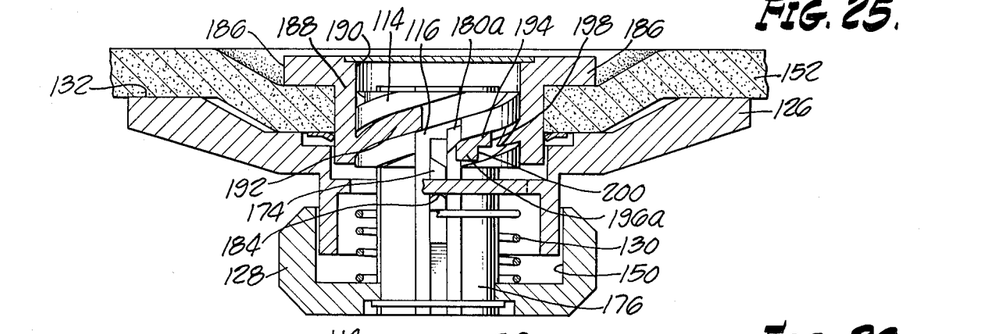
FIG. 25 is a view showing the replacement element in initial engagement with the latching assemblage.

Turning to FIGS. 23 and 25, it can be seen that adapter 186 of this form of the invention has a generally cylindrical wall 188 forming a generally cylindrically shaped opening 190, a plurality of circumferentially spaced apart thead segments or portions 192 projecting radially inwardly from wall 188, a plurality of first locking shoulders 194 disposed proximate one extremity of each thread segment 192 and a plurality of second locking shoulders 196 circumferentially spaced apart from the first locking shoulders 194. The first and second locking shoulders project radially inwardly from wall 188 and have generally axially extending faces 198 and 200 respectively (FIG. 25). While in the form of the invention shown in the drawings three equally spaced apart sets of first and second locking shoulders are provided, any number of shoulders corresponding with a like number of axially movable safety locking members 174 and thread segments 180 could be provided.

OPERATION

With the parts at rest as shown in FIG. 24, adapter 186 of the upper assemblage can be freely threaded onto member 110 to the position shown in FIG. 25. In the configuration illustrated in this Figure, it is to be noted that thread segments 180 of driving member 176, as well as safety locking members 174, are yieldably blocking the threads 114 of member 110 and also that locking shoulder 196a has just moved into engagement with thread segment 180a. Continued rotation of the upper assemblage will result in shoulders 196 camming against thread segments 180 causing compression of spring 130 and the alignment of the thread segments 180 with the threads 114. At the same time, as shown in FIG. 27, the safety locking members 174 are moved downwardly against the urging of spring 130 by the downward movement of member 126 so that they move clear of the thread interruptions 116 in thread 114. Further rotation of the replacement element will cause the parts to move to the position shown in FIG. 26. At this point, shoulders 194 and 196 have moved past thread segment 180 and spring 130 has urged member 110 as well as locking members 174 upwardly into engagement with faces 198 and 200 of the first and second locking shoulders.

Figure 26:
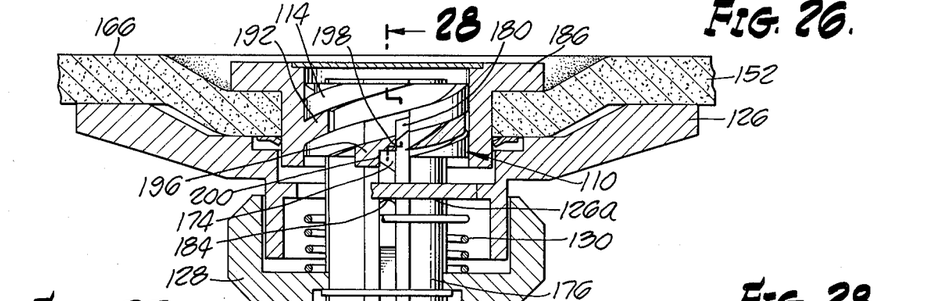
FIG. 26 shows the position of the parts after the replacement element has been further threaded onto the latching assemblage and is locked thereon by the first and second locking mechanism provided in this form of the invention.
Figure 27:
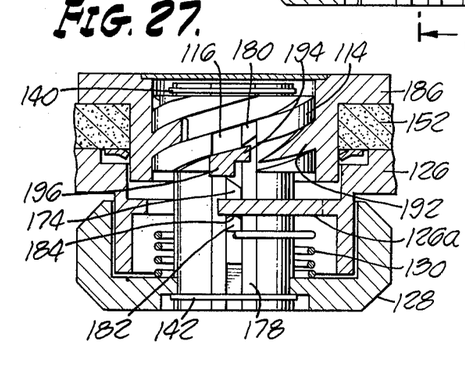
FIG. 27 is a view showing the position of the parts after exertion of a downward pressure on the replacement element.

With the parts oriented as shown in FIG. 26, counterclockwise rotation of the replacement element is blocked and disassembly of the replacement element from the driving subassembly is prevented. It is important to note that in this form of the invention the safety locking members acting against the second locking shoulders of the adapter act as a back-up to the thread segments acting against the first locking shoulders of the adapter. This double lock system makes this last described embodiment highly attractive for use in potentially dangerous power tools such as grinders and radial saws.

As is the case with the earlier described embodiments, to remove the replacement element, downward pressure must be exerted against the replacement element. This will result in downward movement of support member 126 against the urging of spring 130 which, in turn, will cause downward movement of the safety locking members 174 to the position shown in FIG. 27. At the same time, member 110 will be moved downwardly relative to driving member 176 so as to move thread segments 180 into register with threads 114. In this position, the replacement element can be freely rotated in a counterclockwise direction for removal from the driving subassembly.

Having now described the invention in detail in accordance with the requirements of the patent statutes, those skilled in the art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A thread latching mechanism comprising:
   a. a first threaded member having a thread discontinuity;
   b. a second member axially movable relative to said first member, said second member having a thread segment adapted to register with the thread discontinuity of said first member upon relative axial movement between said first and second members;
   c. biasing means for yieldably resisting relative movement between said first and second members so as to hold the thread segment of said second member normally out of register with the thread discontinuity of said first member, said biasing means comprising:
      1. a support means for supporting said first member, said support means having a central aperture therein adapted to telescopically receive said second member;
      2. a hub member affixed to said second member; and
      3. a compression spring interposed between said support means and said hub member for urging relative separation therebetween; and
   d. a third threaded member adapted to threadably engage said first threaded member.

2. A thread latching mechanism comprising:
   a. a first threaded member having a thread discontinuity;
   b. a second member axially movable relative to said first member, said second member having a thread segment adapted to register with the thread discontinuity of said first member upon relative axial movement between said first and second members;
   c. biasing means for yieldably resisting relative movement between said first and second members so as to hold the thread segment of said second member normally out of register with the thread discontinuity of said first member, said biasing means comprising:
1. a connecting pin interconnecting said first and second members; and
2. a compression spring carried by said connecting pin and interposed between said first and second members; and
d. a third threaded member adapted to threadably engage said first threaded member.

3. A thread latching mechanism as defined in claim 2 in which said third member includes means for pressurally engaging said second member to urge relative movement between said first and second members against the resistance of said biasing means to move the thread segment of said second member into register with the thread discontinuity of said first member.

4. The thread latching mechanism as defined in claim 2 including means for moving the thread segment of said second member into register with the thread discontinuity of said first threaded member when said third member is threadably engaged to said first member.

5. Apparatus for mounting a replacement element on a drive element, the combination including:
   a. a threaded assemblage comprising axially movable first and second threaded members, one of which is operatively interconnected with the drive element, one of said members having a thread discontinuity and the other having a mating thread segment which is movable into register with the thread discontinuity of the first mentioned member upon relative axial movement between the members;
   b. a third threaded member operatively coupled with the replaceable element and adapted to threadably engage said threaded assemblage; and
   c. biasing means for yieldably resisting relative movement between said first and second members of said assemblage so as to hold the thread segment of one of said members normally out of register with the thread discontinuity of the other member.

6. The apparatus as defined in claim 5, including means for moving the thread segment of one of the said members into alignment with the thread discontinuity of the other member when said third member is in threaded engagement with said threaded assemblage.

7. The apparatus as defined in claim 6, in which said means for moving the thread segment into alignment with the thread discontinuity comprises a push button element axially movable within a counterbore provided in said third member.

8. Apparatus for mounting a replacement element on a rotary drive element, the combination including:
   a. a first threaded member having a thread discontinuity;
   b. supporting means engageable by said first threaded member for supporting the replacement element;
   c. a second member adapted to be drivably secured to the rotary drive element and having a thread segment movable into the thread discontinuity of said first member to form a continuous thread;
   d. biasing means for yieldably resisting relative movement between said first and second members so as to hold the thread segment of said second member normally out of register with the thread discontinuity of said first member;
   e. a third threaded member carrying the replaceable element adapted to be threaded onto said first member to move the replaceable element into pressural engagement with the supporting means, said third member having threads so constructed and arranged as to urge the thread segment of said second member into temporary alignment with the threads on said first member as said third member is threaded thereon; and
   f. means for moving the thread segment of said second member into alignment with the thread interruption of said first member when said third member is in threaded engagement with said first member.

9. Apparatus for mounting a replacement element on a rotary drive element, the combination including:
   a. a first threaded member adapted to be drivably secured to the rotary drive element, said first member having a thread discontinuity;
   b. supporting means mounted on said first threaded member for supporting the replacement element;
   c. a second member having a thread segment movable into the thread discontinuity of said first member to form a continuous thread;
   d. a spring disposed between said first and second members adapted to resist movement of the thread segment into the thread interruption of said first member;
   e. a third threaded member carrying the replaceable element adapted to be threaded onto said first member to move the replaceable element into pressural engagement with the supporting means, said third member having threads so constructed and arranged as to urge the thread segment of said second member into temporary alignment with the threads on said first member as said third member is threaded thereon; and
   f. means for moving the thread segment of said second member into alignment with the thread interruption of said first member when said third member is in threaded engagement with said first member.

10. Apparatus for mounting a replacement element on a rotary drive element, the combination including:
   a. a driving member adapted to be drivably secured to the rotary drive element, said driving member having a driving spline including a thread segment;
   b. a threaded driven member axially movable relative to said driving member and having a thread discontinuity adapted to receive said thread segment of said driving member, said thread segment being movable into register with the threads of said driven member upon relative axial movement of said members;
   c. biasing means for yieldably resisting relative movement between said driving and driven members so as to hold said thread segment of said driving member normally out of register with the thread discontinuity of said driven member; and
   d. a replacement element adapted to be threadably connected with said driven member, said replacement element having:
      1. threads constructed and arranged so that as said replacement element is threadably interconnected with said driven element said threads will engage said thread segment of said driving member to urge relative movement between said driving and driven members; and 2. a first locking shoulder engageable by said thread segment of said driving member when said thread segment of said driving member is held out of register with the thread discontinuity of said driven member by said biasing means.

11. The apparatus as defined in claim 10 in which said threaded replacement element is provided with a second locking shoulder and in which said apparatus includes a safety locking member carried by said driving member and axially movable relative thereto for engagement with said second locking shoulder when said thread segment of said driving member is held out of register with the thread discontinuity of said driven member by said biasing means.

12. The apparatus as defined in claim 11 wherein said biasing means yieldably urges said safety locking member axially relative to said driving means in a direction toward said driven means.

13. The apparatus as defined in claim 12 including means for moving said safety locking member axially of said driving means in a direction away from said driven means.

14. A thread latching mechanism comprising:
   a. a first threaded member having a thread discontinuity;
   b. a second member axially movable relative to said first member, said second member having a thread segment adapted to register with the thread discontinuity of said first member upon relative axial movement between said first and second members;
   c. biasing means for yieldably resisting relative movement between said first and second members so as to hold the thread segment of said second member normally out of register with the thread discontinuity of said first member;
   d. a third threaded member adapted to threadably engage said first threaded member said third threaded member having a locking shoulder; and
   e. a safety locking means carried by said second member and movable axially relative thereto for engagement with said locking shoulder on said third threaded member when said third threaded member is in threaded engagement with said first threaded member.

15. A thread latching mechanism as defined in claim 14, including biasing means for yieldably holding said locking means in engagement with said locking shoulder when said third threaded member is in threaded engagement with said first threaded member.

16. A thread latching means as defined in claim 15, including means for moving said safety locking means out of engagement with said locking shoulder while said third threaded member is in threaded engagement with said first threaded member.

17. In a replacement element adapted to be replaceably mounted on a threaded rotary drive element and locked against separation therefrom as a result of relative rotational movement, the combination including:
   a. a cylindrical wall forming a cylindrical opening;
   b. a plurality of arcuately spaced apart thread segments projecting radially inwardly from said cylindrical wall, said thread segments being adapted to threadably mate with the threads on the rotary drive element, at least one said thread segment being interrupted to define a generally arcuately extending face threadably engageable with the threads on the rotary drive element and a locking shoulder having a generally axially extending face adapted to lockably engage an axially movable thread segment provided on said rotary drive element to prevent separation of the replacement element and the rotary drive element upon relative rotational movement thereof.

18. A replacement element as defined in claim 17 in which each of said thread segments is interrupted to define a arcuately disposed face threadably engageable with the threads on the rotary drive element, and two spaced apart generally axially extending faces adapted to lockably engage axially movable thread segments provided on said rotary drive element whereby separation of the elements will be prevented upon relative rotational movement thereof.

* * * * *